United States Patent [19]

Wolff et al.

[11] Patent Number: 4,820,481
[45] Date of Patent: Apr. 11, 1989

[54] METHOD FOR THE CONTINUOUS FABRICATION OF HYDROGEN STORAGE ALLOY NEGATIVE ELECTRODES

[75] Inventors: Merle Wolff, Rochester; Mark A. Nuss, Rochester Hills; Michael A. Fetcenko, Royal Oak; Andrea L. Lijoi, Utica, all of Mich.

[73] Assignee: Energy Conversion Devices, Inc., Troy, Mich.

[21] Appl. No.: 185,598

[22] Filed: Apr. 25, 1988

[51] Int. Cl.$^4$ .............................................. B22F 5/00
[52] U.S. Cl. ......................................... 419/3; 419/8; 419/23; 419/30; 419/31; 419/33; 419/38; 419/44; 419/53; 419/54
[58] Field of Search ................... 419/8, 30, 23, 31, 3, 419/33, 38, 44, 53, 54

[56] References Cited

U.S. PATENT DOCUMENTS

4,613,369 9/1986 Koehler .................................. 419/3
4,670,214 6/1987 Magnuson et al. .................... 419/3

Primary Examiner—Stephen J. Lechert, Jr.
Attorney, Agent, or Firm—Richard M. Goldman; Marvin S. Siskind; Kenneth M. Massaroni

[57] ABSTRACT

An improved method for the continuous fabrication of metal-hydride, electrochemical, hydrogen storage alloy, negative electrodes for use in rechargeable nickel metal hydride cells. The improved method comprises the steps of providing measured amounts of powdered metal hydride electrochemical hydrogen storage alloy material and disposing said material upon a continuous wire mesh screen substrate. Thereafter, the powdered metal hydride electrochemical hydrogen storage alloy and wire mesh screen are subjected to a compaction process wherein they are rolled and pressed so as to form a single integral electrode web which is subsequently exposed to a high temperature sintering process in a chemically inert environment. The sintering process is designed to drive off excess moisture in the material while discouraging oxidation of the electrode web and set the electrode web state of charge.

19 Claims, 3 Drawing Sheets

METHOD FOR THE CONTINUOUS FABRICATION OF HYDROGEN STORAGE ALLOY NEGATIVE ELECTRODES

FIELD OF THE INVENTION

The present invention relates generally to the manufacture of rechargeable electrochemical cells. More particularly, the present invention relates to an improved method for the continuous production of elongated, metal hydride, hydrogen storage alloy, negative electrode webs for rechargeable electrochemical cells.

BACKGROUND OF THE INVENTION

Secondary cells using a rechargeable hydrogen storage negative electrode are known in the art. These cells operate in a different manner than lead-acid, nickel-cadmium or other prior art battery systems. The hydrogen storage electrochemical cell utilizes a negative electrode that is capable of reversibly electrochemically storing hydrogen. In one exemplification the cell employs a positive electrode of nickel hydroxide material, although other positive electrode materials may be used. The negative and positive electrodes are spaced apart in an alkaline electrolyte, and may include a suitable separator, spacer, or membrane therebetween.

Upon application of an electrical current to the negative electrode, the negative electrode material (M) is charged by the absorption of hydrogen:

$$M + H_2O + e^- \rightarrow M-H + OH^- \text{(Charge)}$$

Upon discharge, the stored hydrogen is released to provide an electric current:

$$M-H + OH^- \rightarrow M + H_2O + e^- \text{(Discharge)}$$

The reactions are reversible.

The reactions that take place at the positive electrode are also reversible. For example, the reactions at a conventional nickel hydroxide positive electrode as utilized in a hydrogen rechargeable secondary cell or battery are:

$$Ni(OH)_2 + OH^- \rightarrow NiOOH + H_2O + e^- \text{(Charge)},$$
and
$$NiOOH + H_2O + e^- \rightarrow Ni(OH)_2 + OH^- \text{(Discharge)}.$$

A cell utilizing an electrochemically rechargeable hydrogen storage negative electrode offers important advantages over conventional secondary batteries. Rechargeable hydrogen storage negative electrodes offer significantly higher specific charge capacities (ampere hours per unit mass and ampere hours per unit volume) than do either lead negative electrodes or cadmium negative electrodes. As a result of the higher specific charge capacities, a higher energy density (in watt hours per unit mass or watt hours per unit volume) is possible with hydrogen storage batteries than with the prior art conventional systems, making hydrogen storage cells particularly suitable for many commercial applications.

Suitable active materials for the negative electrode are disclosed in U.S. Pat. No. 4,551,400 to Sapru, et al, for HYDROGEN STORAGE MATERIALS AND METHODS OF SIZING AND PREPARING THE SAME FOR ELECTROCHEMICAL APPLICATION incorporated herein by reference. The materials described therein store hydrogen by reversibly forming hydrides. The materials of Sapru, et al have compositions of:

$$(TiV_{2-x}Ni_x)_{1-y}M_y$$

where $0.2 < x < 1.0$, $0 < y < 0.2$ and M=Al or Zr;

$$Ti_{2-x}Zr_xV_{4-y}Ni_y$$

where $0 < x < 1.5$, $0.6 < y < 3.5$., and $$Ti_{1-x}Cr_xV_{2-y}Ni_y$$

where $0 < x < 0.75$, $0.2 < y < 1.0$.

Reference may be made to U.S. Pat. No. 4,551,400 for further descriptions of these materials and for methods of making them.

Other suitable materials for the negative electrode are disclosed in commonly assigned copending U.S. Pat. Ser. No. 947,162 filed Dec. 29, 1986 now U.S. Pat. No. 4,728,586 issued Mar. 1, 1988 in the names of Srinivasen Venkatesan, Benjamin Reichman, and Michael A. Fetcenko for ENHANCED CHARGE RETENTION ELECTROCHEMICAL HYDROGEN STORAGE ALLOYS AND AN ENHANCED CHARGE RETENTION ELECTROCHEMICAL CELL, incorporated herein by reference. As described in the above application of Venkatesan, et al, one class of particularly desirable hydrogen storage alloys comprises titanium, vanadium, nickel, and at least one metal chosen from the group consisting of aluminum, zirconium, and chromium. The preferred alloys described in Venkatesan, et al are alloys of titanium, vanadium, nickel, zirconium, and chromium, especially alloys having the composition represented by the formula:

$$(Ti_{2-x}Zr_xV_{4-y}Ni_y)_{1-z}Cr_z$$

where x is between 0.0 and 1.5, y is between 0.6 and 3.5, and z is an effective amount less than 0.20.

The hydrogen storage alloy is formed from a melt. The production of hydrogen storage negative electrodes utilizing the preferred materials is difficult because these preferred hydrogen storage active materials are not only not ductile, but are in fact, of relatively great or high hardness. Indeed, these alloys can typically exhibit Rockwell "C" ($R_C$) hardnesses of 45 to 60 or more. Moreover, in order to attain high surface areas per unit volume and per unit mass, the alloy must be in the form of small ash or flake-like particles. In a preferred exemplification, the hydrogen storage alloy powder must pass through a 200 U.S. mesh screen, and thus be smaller than 75 microns in size (200 U.S. mesh screen has interstices of about 75 microns). Therefore, the resulting hydrogen storage alloy material must be comminuted, e.g., crushed ground, milled, or the like, before the hydrogen storage material is fabricated into an electrode. Hydrogen storage alloy powders are utilized in the manufacture of the electrode.

The comminuted hydrogen storage alloy powder is applied to a suitable wire mesh or wire screen current collector to form a negative electrode. Various methods of manufacturing electrodes of strip configuration have been previously proposed and utilized, e.g. for cadmium negative electrodes. However, these methods and their associated equipment cannot be used with the high hardness, flake or ash-like active powdered hydrogen storage materials contemplated herein. For example, a system for making cadmium battery plates is suggested in U.S. Pat. Nos. 3,894,886 and 3,951,688. The system described therein utilizes an electrochemically active thioxotropic paste to carry the active material and is thus inapplicable to the herein contemplated and described negative electrode materials.

Another method of making silver strip electrodes involves feeding a free-flowing powder onto a moving paper web. Vibrating doctor blades spread the powder on to the carrier to a pre-determined thickness. A grid structure or mesh is introduced to the powder and carrier. A single rolling mill compresses the grid and powder on the carrier, and thereafter the carrier is withdrawn. The remaining web of silver electrode material impregnated into a grid is then sintered. After the sintered silver electrode web leaves the sintering furnace, it is cut into strips for use in silver-zinc electrochemical cells.

The above described system cannot be used with the high hardness, hydrogen storage alloy, active powdered material herein, because the hydrogen storage alloy powder does not behave in the same way as the silver powder and mesh grid in the silver electrode production line and in the production equipment. When the high hardness powder used here is compressed onto a paper carrier, the powder particles stick to and can even become embedded in the paper. Web tearing or other web damage can result. In addition, the hydrogen storage alloy electrode materials are typically deposited as a relatively thin layer of flake-like particles on a smooth, hard carrier. It has been found that doctor blades are ill-suited to provide a precisely controlled thickness or depth of powder, because the powder flakes or ash-like particles tend to commingle and build up in front of the blades. A powder layer of irregular thickness and density with regions of inadequate depth results. Uniformity of powder depth, and consequently uniformity of the amount of active material per unit area, is necessary to provide a uniform electrode strip. A uniform strip thickness is essential for battery electrodes if the battery is to have a uniform current density, and make efficient use of space within the cell.

Hydrogen storage electrodes for sealed cells have previously been prepared by various methods as described in, for example, U.S. Pat. No. 4,670,214 to Douglas Magnuson, Merle Wolff, Sam Lev, Kenneth Jeffries, and Scott Mapes for "METHOD FOR MAKING ELECTRODE MATERIAL FROM HIGH HARDNESS ACTIVE MATERIALS", the disclosure of which is incorporated herein by reference. The method disclosed therein is not however, altogether adequate for the most efficient method of continuously producing large area hydrogen storage alloy negative electrodes. Specifically, the previous method allowed the active negative electrode powder to be transported through an ambient environment to the fabrication apparatus on a temporary web, substrate or carrier means. Exposure to the atmosphere resulted in the oxidation of catalytically active sites in the active material. Additionally, the use of a strip of non-reusable, organic polymeric carrier material, such as, for example Mylar (a registered trademark of Dupont), to transport the active material to the mesh substrate and through the compaction process adversely affected electrode production in two critical ways: cost of manufacture and accuracy of production. Specifically, the carrier, since it was not reusable, added cost to the manufacture of the negative electrode. More importantly, the carrier had a tendency to deform in a non-uniform manner when subjected to roller mill compaction. This resulted in non-uniformities in the thickness of the electrode web after passing through the roller mills.

A further problem often encountered in the fabrication of hydrogen storage negative electrodes are the deleterious effects of oxygen and water. While alluded to above with respect to the transfer of the material to the compaction process, the problem is particularly acute during, and immediately after sintering. Oxygen and water cause the electrode material to be less functional by bonding to catalytic sites, thereby requiring more charge/discharge cycles to activate these sites. Additionally, oxygen and water react with the electrode material in the sintering process, lowering the ultimate electrode capacity. This necessitated purging the electrode web of oxygen and water. The preferred prior art method called for heat treating the electrode web in a large volume argon purged environment. This process of course required a significant economic investment in argon. The prior art also failed to make use of a controllable system for the incorporation of hydrogen in the electrode web, which hydrogen sets the charge state, i.e., partially charges the electrode web.

Finally, prior art continuous systems were subject to frequent mechanical failure as a result of the electrode web "walking". "Walking" is the lateral movement of the electrode web across the roller mills. This walking results in numerous tears and consequent splices in the electrode web, which is costly in terms of lost product, and is incompatible with apparatus used in subsequent downstream processing steps.

SUMMARY OF THE INVENTION

Disclosed herein is a method of substantially continuously fabricating a large area metal hydride electrochemical hydrogen storage alloy negative electrode, for use in rechargeable nickel-metal hydride electrochemical cells. The improved method comprises the steps of providing a measured amount of powdered metal hydride electrochemical hydrogen storage alloy material; and providing a substantially continuous wire mesh screen current collector substrate. A layer of the hydrogen storage alloy material is disposed, in an inert environment, substantially in contact with the wire mesh screen current collector substrate. The hydrogen storage alloy material and the wire mesh screen current collector are subjected to at least one compaction process, so as to incorporate the powdered hydrogen storage alloy material into the wire mesh screen current collector. After compaction the hydrogen storage alloy impregnated wire mesh screen current collector is preheated and then sintered. Sintering is carried out in a high temperature, substantially inert atmosphere containing hydrogen, e.g., 5 volumetric percent hydrogen. The preheating process liberates excess moisture in said materials, discourage the oxidation of the active materials contained therein. Sintering then bonds the particles together. Subsequently, a partial charge to the electrode material is applied by exposure to controlled amounts of hydrogen during cooling of the electrode.

The improved method further includes the process of synthesizing active electrode material by providing operative, measured quantities of suitable precursor materials, such as titanium, zirconium, vanadium, nickel, chromium and combinations thereof, in elemental form, and exposing the active materials to a high temperature, inert atmosphere environment so as to melt the precursor materials into an ingot of multicomponent, multiphase hydrogen storage alloy. The ingot may then be subjected to a hydrogen cracking process so as to hydrogenate and partially pulverize the active material. Thereafter, the pulverized material is further comminuted. The comminution is carried out in a substantially inert atmosphere so as to yield powdered metal-hydride, hydrogen storage alloy material of suitable size, e.g., approximately 200 mesh size.

The powder is placed in intimate contact with a wire mesh screen current collector substrate. The current collector may be a nickel mesh or a nickel plated steel mesh. The wire mesh screen is directed to the contact point by a series of steering devices adapted to prevent the mesh from wandering or "walking" thereby causing non-uniformities in the electrode web. Additionally, the active powder material should be kept in an inert, e.g., argon environment so as to discourage exposure to oxygen and water.

The wire mesh screen and powdered hydrogen storage alloy are next compacted in at least one and preferably two or more roll mill compactions of at least 16 tons per inch of width. After being exposed to said roll mill compaction processes, the powdered hydrogen storage alloy material becomes an integral part of the wire mesh screen, both of which are then trimmed and exposed to a preheating process and a high temperature, argon or argon-hydrogen atmosphere, sintering process. The preheat process takes place at temperatures sufficiently high to drive off excess moisture and to discourage oxidation in the wire mesh screen and the hydrogen storage alloy material. The sintering process is carried out at temperatures sufficiently high to promote particle-to-particle bonding and bonding of the powder to the current collector.

DETAILED DESCRIPTION OF THE INVENTION

The first step in the fabrication of metal-hydride, electrochemical, hydrogen storage alloy negative electrodes is the production of the metal hydride, electrochemical, hydrogen storage alloy. The synthesis of the alloy begins with selection of precursor materials in their elemental form. Materials commonly employed in said synthesis are disclosed in the aforementioned U.S. Pat. No. 4,551,400, and include, but are not limited to titanium, zirconium, vanadium, nickel and chromium and thermally decomposable compounds thereof. These materials must be mixed in combined form, so as to form a metal-hydride, hydrogen storage alloy suitable for use as a hydrogen storage negative electrode material in improved, metal-hydride rechargeable electrochemical cells.

The precursor materials are thoroughly mixed, and subjected to conditions adapted to fabricate hydrogen storage alloys having the nominal composition $(Ti_{2-x}Zr_xV_{4-y}Ni_y)_{1-z}Cr_z$ where x is between 0.0 and 1.5, y is between 0.6 and 3.5, and z is an effective amount less than 0.20. The invention disclosed herein may be employed to fabricate electrodes of any metal hydride material such as, for example, lanthanum nickel type materials which may include modifiers and mischmetals. Measured amounts of the precursor materials are placed into a high temperature furnace such as an autoclave, to melt the materials under conditions to form a substantially homogenous ingot. Once the materials are placed in the autoclave, the autoclave is evacuated to a pressure of approximately $10^{-3}$ torr. The autoclave is then purged with an inert gas such as argon at a pressure of approximately one atmosphere. Thereafter, the autoclave is heated to a temperature sufficient to melt the elemental active materials contained therein.

The molten materials should be allowed to cool to solid ingot form prior to removal from the autoclave. After cooling, the ingot is removed from the autoclave and is comminuted. The first comminution step is generally a hydrogenation step wherein the ingot is placed in a vacuum pressure vessel and subjected to hydrogenation-dehydrogenation cycling. In one exemplification, the vacuum pressure vessel is evacuated to a pressure of approximately 10 millitorr and thereafter, hydrogen gas is added to the vacuum pressure vessel at a pressure sufficient to at least partially hydrogenate the ingot, e.g., a pressure of approximately 50 pounds per square inch. Hydrogenation of the alloy causes a cracking or pulverization of the ingot. This hydrogen exposure continues until complete, after which the vacuum pressure vessel is heated to approximately 400° Centigrade as it is evacuated to a low pressure so as to remove bonded hydrogen. After the hydrogen gas has been removed from the vacuum pressure chamber, the comminuted product is allowed to cool down to room temperature in an inert environment. The resulting "rubble" is generally less than about one eighth ($\frac{1}{8}$) inch in size.

After hydrogen pulverization, the resulting powder may be further comminuted. This further commination may be carried out by any suitable comminuting means, e.g., grinders, pulverizers or crushing apparatus. Which ever means is employed, it should be carried out in an inert atmosphere and at low temperatures so as to preserve the electrochemical behavior of the material. Additionally, since the hydrogen storage materials herein described are of high hardness, care must be taken to avoid abrasion of grinding media which could influence electrochemical behaviour. For example, iron contaminants should be avoided as iron will deleteriously affect the performance of the hydrogen storage materials. In a preferred embodiment, the further comminuted material is of 200 mesh size or smaller.

Thereafter, the 200 mesh hydrogen storage alloy powder is transported, still in an inert environment, to a loss in weight feeder device 30. It is important to note that the material does not contain any binder material. Binder materials may degrade the mechanical or electrochemical integrity of the hydrogen storage alloy. This is in contradistinction to materials of the prior art which require the use of binder agents such as thioxotropic additives, or water and slurry mixes to hold the active material together during subsequent pressing and sintering steps.

Figure 1:
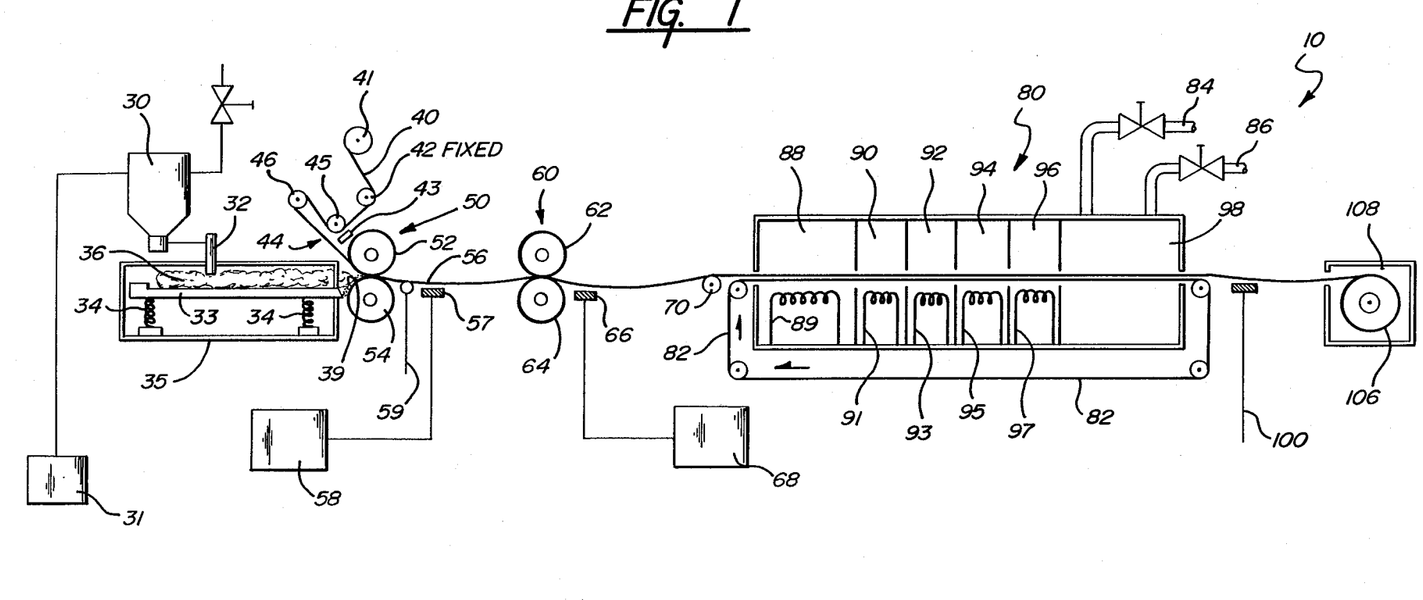
FIG. 1 is a stylized perspective view of an apparatus adapted to carry out the continuous fabrication of hydrogen storage alloy negative electrodes by the method disclosed herein.

As mentioned hereinabove, the active material is introduced into a loss-in-weight feeder 30 which is connected to a microprocessing means 31 adapted to calibrate the rate at which active material is released by the loss-in-weight feeder 30. Active powder material released from the loss-in-weight feeder 30 passes through a feeder hose 32, and onto a vibrating chute assembly 33 which deposits measured amounts of active material powder at the loading nip 39 of a first roller mill assembly. The vibrating chute assembly 33 is mounted, both front and rear, with springs 34 adapted to prevent damping of the vibration of the chute assembly 33 as by other parts of the apparatus 10. The chute assembly 33 is flanked by housing 35 adapted to provide and contain a blanket of inert gas 36, e.g., argon. It is noteworthy that no cover or top is required on housing 35 to maintain the argon blanket 36 around and in contact with the powdered alloy. This is due to the fact that argon is heavier than air, and therefore remains substantially in the housing 35. The argon blanket 36 is contained above the trail of active material in the chute assembly 33. As mentioned hereinabove, lack of this argon blanket, as in prior art devices, resulted in the incorporation of oxidizing air and water in the web of electrode material, particularly since the hydrogen storage material is porous. These contaminants react with the alloy powder during the sintering process, thus resulting in lower quality electrodes.

The hereinabove mentioned microprocessing means 31 may be connected to downstream, feed monitoring devices (not shown) and is programmed to automatically adjust the powder delivery of the vibrating chute assembly 33 so as to deposit active powdered material in the loading nip 39 at a weight rate which provides the material at a highly uniform weight per unit area. Thus, as the throughput of the process increases, more active powdered material is delivered; and as the throughput slows down, less powder is provided. Thus, the loss-in-weight delivery mechanism deposits the powdered negative electrode hydrogen storage alloy active material in the loading nip region 39 at a highly uniform weight per unit area. In this way, a precisely controlled amount of powdered material is delivered to each measure of substrate area. It is noteworthy to point that no doctor blades, squeegees, or other inprecise adjustment devices are needed. In fact, devices such as these have been found to be unacceptable for the precise delivery of the types of materials that must be measured in an apparatus of this type. Additionally, the need for a carrier strip to transport active material to the mill is obviated since the active material is deposited directly upon the lower roller of a roller mill assembly. Further, the improved method allows for reduced chance of non-uniformities in the electrode web, and reduced overall production costs.

Figure 2:
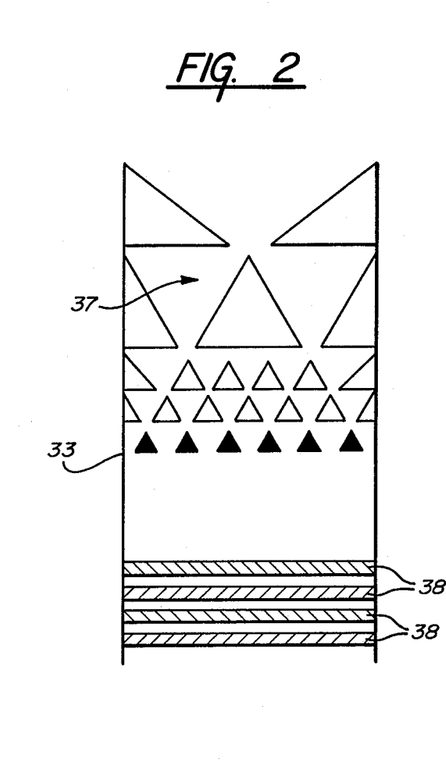
FIG. 2 is a top plan view of the vibrating chute assembly of FIG. 1, specifically illustrating the first divider means, a series of extending, descending triangles, and the second divider means, a series of transversely extending grooves, both adapted to assure uniform material distribution.

Turning now to FIG. 2, there is illustrated therein a top plan view of the vibrating chute assembly 33 of FIG. 1. Specifically, chute assembly 33 includes a plurality of material divider means adapted to distribute the trail of active electrode material in an even, uniform manner. The first material divider means typically takes the form of a plurality of triangular separators 37 ordered in a descending cascade array. Material first passes through these triangles 37 and is transported to the second material divider means, which takes the form of a plurality of transversely extending grooves 38. The grooves 38 are adapted to assure lateral distribution of active material prior to depositing the material in the loading nip region 39 of apparatus 10.

Returning now to FIG. 1, the continuous process apparatus 10 further provides a means for feeding the wire mesh screen current collector substrate 40 thereinto. The wire mesh screen current collector substrate 40 is, in this case, a continuous web of nickel mesh provided from a roll 41. It is important to note that the subject invention is not limited to the use of a nickel wire mesh. Other types of materials may be employed with equal success. Examples include steel and nickel plated steel wire mesh, as well as expanded metal or perforate sheet metal.

Figure 3A:
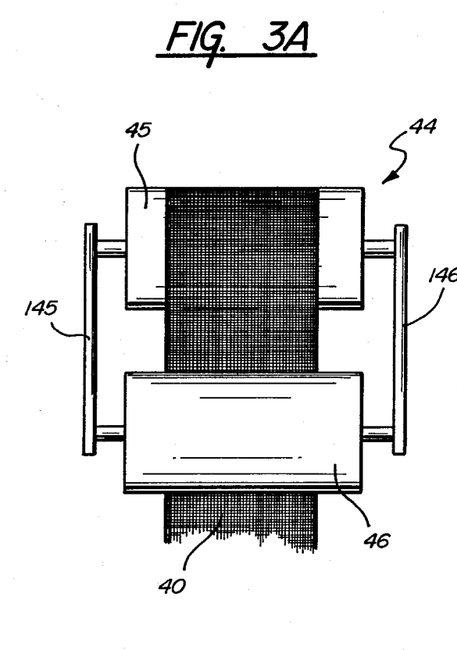
FIGS. 3A-3C illustrate several stylized perspective views of the steering mechanism employed to prevent the electrode web from laterally walking across the rollers of the apparatus.
Figure 3B:
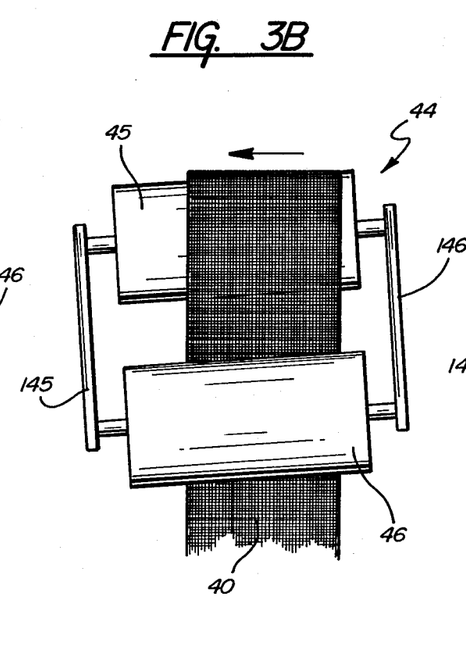
Figure 3C:
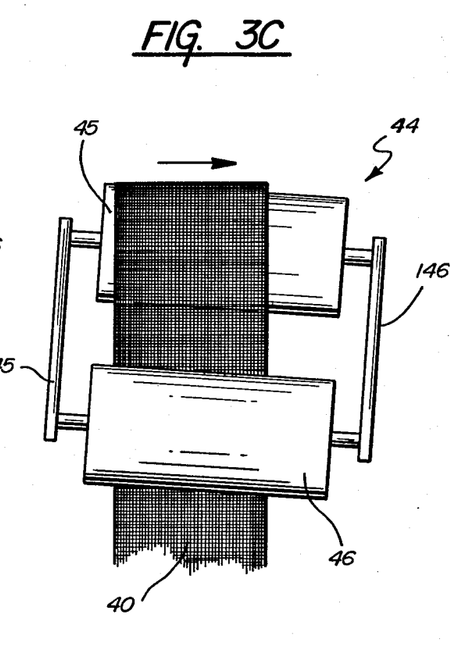

As is illustrated in FIG. 1, the wire mesh screen substrate 40 passes a fixed positioning roller 42 which roller 42 directs the wire mesh current collector substrate 40 past an electronic sensor 43, and vertically to positioning apparatus 44. Sensor 43 is adapted to monitor the lateral "position" of the wire mesh current collector substrate 40 as it enters the first roller mill 50. Sensor 43 is in electrical communication with a movable positioning apparatus 44, adapted to correct for substrate walk. FIGS. 3A–3C specifically illustrate the positioning apparatus 44. The positioning apparatus 44 consists of a pair of rollers 45, 46 adapted to pivotally change their position relative to the first roller mill 50 so as to correct for substrate "walk". Referring specifically to FIG. 3A there is illustrated therein positioning apparatus 44 comprising rollers 45, 46, positioning blocks 145, 146 and wire mesh current collector substrate 40 passing therethrough. In FIG. 3A, wire mesh substrate 40 is illustrated as correctly oriented with respect to rollers 45, 46 and thus, the rollers 45, 46 are positioned parallel to one another and perpendicular to the path of the substrate 40. As the wire mesh substrate 40 travels laterally to the right across rollers 45, 46, as is illustrated in FIG. 3B, the right end portions of roller 45, 46 pivot towards the substrate 40 while the left end portion of rollers 45, 46 pivot away. This in turn causes the wire mesh substrate 40 to travel back towards the center of rollers 45, 46. Similarly, in FIG. 3C, as the wire mesh substrate 40 moves to the left of rollers 45, 46 the rollers respond by pivoting so as to cause the substrate 40 to return to the preferred orientation. Once the wire mesh substrate 40 has returned to the preferred position, the rollers 45, 46 assume the orientation illustrated in FIG. 3A.

Figure 4:
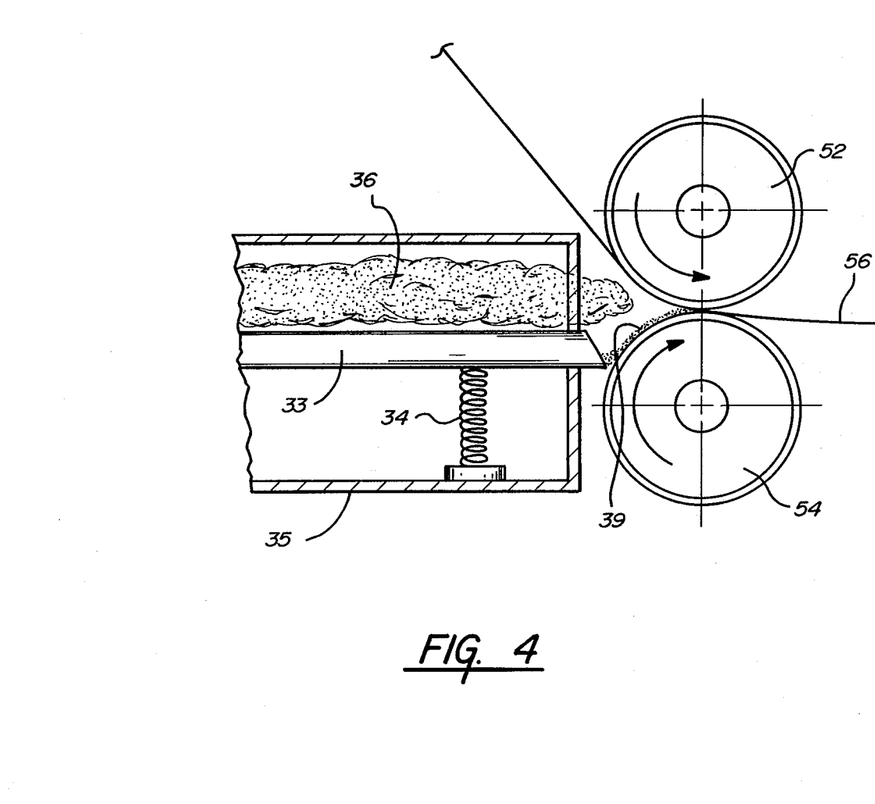
FIG. 4 is an exploded perspective view of the loading nip region, specifically illustrating the flow of active material onto the lower roller of the first roller mill, which material is carried by said roller into contact with the wire mesh screen current collector, and through the first roller mill.

After passing roller 46, the wire mesh current collector substrate 40 is directed towards the loading nip region 39, where it meets the powdered active material at the nip 39 of the first of at least two roller mills, herein, 50 and 60. More particularly, and as is illustrated in FIG. 4, chute assembly 33 deposits the active material upon the lower roller 54 of the first roller mill 50, at a point before the wire mesh current collector 40 enters the roller mill 50. The lower roller 54 then advances the material into the mill, and into contact with the wire mesh current collector substrate 40. Alternatively, the wire mesh substrate 40 and positioning apparatus 44, may be located below apparatus 10, so that the active material powder is deposited directly upon the substrate 40 and the lower roller of roller mill 50. In accordance with one embodiment of this invention, the wire mesh screen current collector substrate 40 and the powdered active material are thereafter compacted together by a series of compaction roller mills into an electrode web.

Referring now to FIG. 1, the wire mesh current collector substrate 40 and the active powdered material pass through a first pair of rollers 52 and 54 of the first roller mill assembly 50. It is preferred that rollers 52 and 54 address each other with a roll force of at least 16 tons per inch of width thus compacting the incoming wire mesh substrate 40 and active powder. When compacted, the powdered material and substrate adhere in a continuous electrode web 56 having a controlled thickness as required for a given battery size. Examples of preferred electrode thickness range from approximately 5 to 30 mils.

The electrode web 56 is next exposed to a pair of trim wheels 59 adapted to trim excess wire mesh substrate 40 from the edges of electrode web 56. The first roller mill 50 is driven so as to provide a very small amount of slack. Slack sensors (not shown) may be interposed between roller mills 50 and 60 to sense the amount of slack provided, and to provide corresponding signals to the roller control microprocessor 58. The roller mills 50 and 60 do not operate at precisely the same speed because the powder and mesh being compressed therein deforms and elongates the electrode web 56 as it moves between the roller mills 50, 60.

Immediately thereafter, the electrode web 56 passes an electric eye mechanism 57. The electric eye 57 is adapted to sense the thickness of the electrode web 56. Any deviation from the ideal or desired thickness is sensed by the electric eye 57 and relayed to an independent microprocessing means 58 which is in electrical contact with rollers 52 and 54. The independent microprocessing means 58 can thus affect a change in the relative position of said rollers with respect to one another. This allows the apparatus to turn out a continuous, electrode web of substantially uniform thickness. In another preferred embodiment, the rollers 52, 54 of the first roller mill 50 are preset to a desired orientation, and remain stationary thereafter, thus, eliminating the need for the electric eye 57.

It is important to note that the active material employed in the electrode web 56 is porous. Prior art systems allowed this material to be compacted in a roller mill having a conventional air environment, thereby trapping deleterious components such as air and water vapor within the material's pores, making contaminants difficult to remove. These deleterious components react with the materials in the subsequent sintering process, and further required a longer activation cycle to completely charge, i.e., activate the electrode. The present method incorporates argon into the pores of active material during the compaction process. Since argon is incorporated into the pores of the electrode web 56, less argon is required in a subsequent purge stage, thereby yielding a significant economic savings. Additionally, the higher quality electrode web 56 is more easily and quickly activated thus yielding further economic savings.

The electrode web 56 next enters the second roller mill 60. This second roller compaction is particularly preferred because the use of a single, large roller mill is relatively expensive as compared to two smaller roller mills. Two roller mills in series is believed to promote longer individual roller mill life. It is to be understod, however, that a single roller mill can be employed in this process. The second roller mill 60 is comprised of two rollers 62 and 64 which address each other with a roll force of at least 16 tons per inch of width of substrate. This second compaction increases the density of the active powdered material and the wire mesh screen current collector substrate 40. The second compaction also allows improved control and uniformity of electrode web 56 properties, particularly web thickness.

In another embodiment a second electric eye apparatus 66, (attached to a second microprocessing means 68) may be disposed adjacent to, e.g., beneath, the electrode web 56 immediately upon exiting the second roller mill assembly 60. The function of the second electric eye apparatus 66 and microprocessor 68 is the same as that of the first electric eye apparatus 57 described hereinabove. The electric eye 66 and microprocessor 68 monitor and sense the position of the electrode web 56 as it exits the second roller mill 60. Deviations from the desired position are detected, and corrections may be affected by changing the relative position of rollers 62 and 64. This is accomplished by the microprocessor 68, which is in electrical communication with roller 62.

Upon completing the second roller mill compaction process described hereinabove, the electrode web 56 passes into a multi-chambered sintering furnace 80. The sintering furnace 80 comprises a plurality of individual heating chambers, preferably at least four heating zones or chambers, adapted to sinter the electrode web 56 at high temperatures. It is preferred that some slack is provided between roller mill 60 and sintering furnace 80 so as to compensate for subtle speed variations between said operations. Prior to actually entering the high temperature sintering furnace 80, a position roller 70 is interposed along the course of the electrode web 56 so as to correctly direct electrode web 56 towards transport conveyor 82. The conveyor 82 is adapted to move the electrode web 56 through the sintering furnace without putting excessive strain upon it. The sintering process occurs in a substantially oxygen free anhydrous, argon-hydrogen atmosphere, preferably consisting of at least approximately 95 percent argon, balance hydrogen, and preferably, and approximately 98 percent argon, and 2 percent hydrogen by volume. The argon and hydrogen pressure in the atmosphere of the furnace 80 is provided by argon valve 84 and hydrogen valve 86 respectively. However, it is to be understood that other hydrogen/argon ratios can be used. The critical consideration is a sufficient amount of hydrogen to properly set the desired state of charge within the negative electrode while cooling. Safety steps however must be observed at higher hydrogen concentrations, i.e. such as gas burnoffs.

To avoid oxidizing the electrode web material 56, a sintering atmosphere within the furnace 80 is maintained substantially free of oxygen and water, usually both at less than 10 parts per million. Thus, a dew point of approximately minus fifty degrees centigrade and preferably at least minus 65 degrees Centigrade or less is maintained within the sintering furnace. This is necessary because moisture present in the sintering furnace adversely reacts with the electrode web 56. The small amount of hydrogen which is provided to the sintering furnace, among other functions, inhibits oxide formation on the active material of the electrode web 56, encourages reduction of residual oxygen in the atmosphere and sets the state of charge of the electrode web 56.

After passing on to the transport conveyor 82, the electrode web 56 enters into a first pre-heat zone 88 equipped with heating elements 89. In a preferred embodiment the pre-zone 88 is adapted to pre-heat the electrode web 56 to approximately 110 degrees Centigrade. The residence time of the electrode web 56 in the pre-heat zone 88 is approximately 10 to 20 minutes, and preferably approximately 15 minutes. It is to be understood, however, that the amount of time during which the electrode web 56 is subjected to a pre-heat environment may be varied without departing from the spirit or scope of the present invention. Upon exiting the pre-heat zone 88, the electrode web 56 passes into the first of a plurality of short sintering temperature zones. In a preferred embodiment the apparatus 10 comprises four short sintering zones, 90, 92, 94 and 96, each equiped with heating elements 91, 93, 95 and 97, respectively. The temperatures within said zones may vary from 800°-1100° centigrade, depending upon the residence time of the electrode web 56 within said zones and the exact composition of the alloy. It is preferred that the electrode web 56 be sintered over all four zones for a total of at least about 3 to 5 minutes, at a temperature of 900°-950° centigrade.

Thereafter, the electrode web 56 enters a cooling zone 98 of a suitable length, to allow cooling and partial hydrogen charging of the web 56. In a preferred embodiment, the cooling zone is approximately 30 to 50 feet long. To control the cooling rate of the web 56, the cooling zone 98 may be equipped with, for instance, a heat exchanger (not shown) having a lower water cooled element and an upper water cooled element located in close proximity to the hot electrode web 56. The cooling zone is further adapted to maintain the electrode web 56 in an anhydrous, oxygen free environment containing a controlled amount of hydrogen in a substantially argon atmosphere. In addition to the advantages described hereinabove, the hydrogen preferentially bonds to sites, e.g., electrocatalytic sites, in electrode web 56, thereby partially charging the electrode by chemical (as opposed to electrochemical) means. The advantage of gas phase chemical charging is that by partially charging the electrode web 56, the electrode web 56 enters cell assembly steps at a proper state of charge relative to the positive electrode, for proper cell balancing. The concept by which this chemical charging occurs is described in U.S. Pat. No. 4,716,088, issued Dec. 29, 1987, the disclosure of which is incorporated herein by reference.

The precise setting of state of charge for a metal hydride negative electrode, as described in the aforementioned '088 patent requires exeptionally accurate metering of the hydrogen gas, as for example by an MKS mass flow controller. This precise control is required since the actual hydrogen absorption rates are dependent upon a number of various factors, including for example: cooling rate from sintering temperatures; catalytic activity of the specific metal hydride material, which is itself dependent upon atmospheric contaminants; residence time of the electrode web 56 is the cooling zone 98; and partial pressure of hyrogen in the cooling zone 98.

In a preferred embodiment, the electrode web 56 is cooled from approximately 900° centigrade to less than 50° centigrade, and preferrably about 25° centigrade, in approximately 15 minutes, which is the residence time of the web 56 in the cooling zone 98. Since the ends of the sintering furnace 80 are open to atmospheric conditions, the partial pressure must be controlled by volumetric flow rate. Given the preferred cooling rate, and a desired hydrogen content of about 0.02-0.08 weight percent hydrogen, a hydrogen concentration of about 3 volumetric percent is required. It is known that under the above described conditions, hydrogen content increases linearly with hydrogen flow rate.

The cooled and sintered web 56 then passes through an exit gate which may include a corresponding signal generation means to a take up roller control microprocessor. Again, it is desired that slack be provided in the web 56 and to that end slack controllers 100 may be located just downstream of the exit point from the sintering furnace 80. The electrode web 56 is then wound on a takeup roll 106, which takeup roll may be housed in a chamber 108, which is oxygen free and flooded with an inert gas such as argon. The completed roll 106 of negative electrode material may then be removed, stored in an nonoxidizing inert environment and transported to other sites for immediate battery manufacture, or stored free of degrading and deleterious oxidizing affects until such time as the material is needed.

In the preferred embodiment for the substantially continuous fabrication of a hydrogen storage alloy electrode web, the method includes the steps of: providing a continuous current collector substrate in the form of a nickel or nickel plated steel wire mesh screen; providing a measured amount of active, hydrogen storage alloy which alloy includes titanium, zirconium, vanadium, nickel and chromium; disposing said hydrogen storage alloy in contact with the current collector substrate in an inert environment and subjecting said alloy and substrate to at least two roller mill compactions of at least 16 tons pressure per inch of substrate width each; and sintering said materials in a sintering furnace which includes a plurality of individual pre-heating, sintering and cooling chambers.

While the invention has been described in connection with preferred embodiments and procedures, it is to be understood that it is not intended to limit the invention to the described embodiments and procedures. On the contrary, it is intended to cover all alternatives, modifications and equivalence may be included within the spirit and scope of the invention as defined by the claims appended herein and after.

We CLAIM:

1. A method of substantially continuously fabricating a large area, metal hydride electrochemical hydrogen storage alloy negative electrode for use in a rechargeable nickel-metal hydride battery, said method comprising the steps of:

providing a continuous, wire mesh screen substrate;

providing a measured amount of powdered metal hydride electrochemical hydrogen storage alloy material;

continuously disposing a layer of the hydrogen storage alloy material into contact with the wire mesh screen substrate, in a substantially inert atmosphere;

compacting the hydrogen storage alloy material into the wire mesh screen so as to form a g-reen deposit thereof;

pre-heating the green deposit of hydrogen storage alloy wire mesh screen;

sintering the green deposit of hydrogen storage alloy wire mesh screen in an anhydrous, substantially oxygen free inert atmosphere so as to liberate moisture therefrom; and cooling said sintered hydrogen storage alloy wire mesh screen in a controlled hydrogen atmosphere so as to impart a partial charge thereto.

2. The method as in claim 1, wherein said metal hydride, hydrogen storage alloy material has the composition:

$$(Ti_{z-x}Zr_xV_{4-y}Ni_y)_{1-z}Cr_z$$

where x is between 0 and 1.5, y is between 0.6 and 3.5, and z is an effective amount less than 0.20.

3. The method as in claim 2, wherein said metal hydride, hydrogen storage alloy material further includes lanthanum nickel type materials.

4. The method as in claim 3, wherein the step of providing a source of powdered metal hydride electrochemical hydrogen storage alloy includes the steps of:
providing measured quantities of metal hydride hydrogen storage alloy precursor materials;
exposing said precursor materials to a high temperature, inert environment so as to melt said materials into an ingot form of homogenous alloy material;
subjecting said homogenous ingot of alloy material to a source of hydrogen so as to hydrogenate said alloy material; and
comminuting said hydrogenated alloy material in a substantially inert atmosphere to yield powdered metal hydride hydrogen storage alloy material of approximately 200 mesh size.

5. The method as in claim 1, wherein the wire mesh screen substrate is selected from the group consisting of a nickel mesh, a nickel plated steel mesh, expanded metal, perforate sheet metal or combinations thereof.

6. The method as in claim 1, wherein the preferred wire mesh screen substrate is a nickel mesh.

7. The method as in claim 1, wherein the step of disposing a layer of hydrogen storage alloy material includes the further steps of:
precisely distributing measured position of said alloy material in a highly uniform manner;
providing an inert gas blanket disposed over said alloy material; and
operatively depositing said alloy material relative to said wire mesh screen substrate.

8. The method as in claim 7, wherein the wire mesh substrate is automatically guided by a steering apparatus comprising: at least two elongated roller means operatively disposed so as to effect pivotal movement relative to the path of travel of the wire mesh substrate.

9. The method as in claim 7, wherein the step of compacting said hydrogen storage alloy material upon said wire mesh screen includes the steps of:
subjecting said alloy material to a first roller mill compaction of at least 16 tons per square inch of width;
removing excess wire mesh screen from the longitudinal edges of said impregnated wire mesh screen;
adjusting the relative position of said alloy impregnated wire mesh screen with respect to the first roller mill; and
subjecting said alloy material to a second roller mill compaction of at least 16 tons per square inch of width.

10. The method as in claim 6, wherein said alloy materials and wire mesh screen is compacted to a uniform thickness of between 5 and 30 mils.

11. The method as in claim 10, wherein said alloy materials and wire mesh screen is compacted to a preferred thickness of 11 to 13 mils.

12. The method as in claim 1, wherein the step of sintering said hydrogen storage alloy impregnated wire mesh screen includes the steps of:
preheating the impregnated wire mesh to a temperature capable of liberating moisture present therein;
exposing the impregnated wire mesh to a high temperature sintering process; and
cooling the impregnated wire mesh in a hydrogenated atmosphere.

13. The method as in claim 12, wherein the step of preheating the alloy impregnated wire mesh includes the step of heating to a temperature of at least 100° C. for a time of at least 10 minutes.

14. The method as in claim 13, wherein the step of high temperature sintering includes the step of exposing said alloy impregnated wire mesh to temperatures of at least 900° C. for at least 3 minutes.

15. The method as in claim 14, further comprising the step of cooling the alloy impregnated wire mesh screen to less than 50° C.

16. The method as in claim 15, further including the step of controllably setting the state of the electrode charge during cooling.

17. The method as in claim 16, wherein the step of setting the state of the electrode charge includes subjecting the sintered, alloy impregnated wire mesh to a controlled source of hydrogen while said impregnated wire mesh is cooling.

18. The method as in claim 17, wherein the source of hydrogen is an anhydrous, substantially oxygen free hydrogen gas.

19. The method as in claim 1, including the further step of collecting said alloy impregnated material in a rolled configuration in an inert atmosphere.

* * * * *